(12) United States Patent
Nam et al.

(10) Patent No.: US 10,365,512 B2
(45) Date of Patent: Jul. 30, 2019

(54) DISPLAY PANEL

(71) Applicant: Samsung Display Co., Ltd., Yongin-si (KR)

(72) Inventors: Jung-Gun Nam, Suwon-si (KR); Hyang-Shik Kong, Seongnam-si (KR); Soo-Lin Kim, Seoul (KR); Tae-Woo Kim, Seoul (KR); Dae-Young Lee, Seoul (KR); Gug-Rae Jo, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 296 days.

(21) Appl. No.: 14/921,653

(22) Filed: Oct. 23, 2015

(65) Prior Publication Data
US 2016/0313601 A1 Oct. 27, 2016

(30) Foreign Application Priority Data

Apr. 24, 2015 (KR) .................. 10-2015-0058051

(51) Int. Cl.
G02B 5/20 (2006.01)
G02B 5/30 (2006.01)
G02F 1/1335 (2006.01)

(52) U.S. Cl.
CPC ....... *G02F 1/133528* (2013.01); *G02B 5/201* (2013.01); *G02B 5/3058* (2013.01); *G02F 1/133512* (2013.01); *G02F 1/133514* (2013.01); *G02F 2001/133548* (2013.01); *G02F 2001/133567* (2013.01)

(58) Field of Classification Search
None
See application file for complete search history.

(56) References Cited

U.S. PATENT DOCUMENTS

| 5,946,066 A * | 8/1999 | Lee .................. G02F 1/134363 349/110 |
| 7,136,122 B2 | 11/2006 | Tak |
| 7,989,254 B2 | 8/2011 | Yoon |
| 8,502,243 B2 | 8/2013 | Kim et al. |
| 2002/0085154 A1* | 7/2002 | Hattori .................. G06F 1/1337 349/123 |
| 2007/0126952 A1* | 6/2007 | Yan .................. G02F 1/133514 349/106 |
| 2009/0290105 A1* | 11/2009 | Takada .............. G02F 1/133528 349/96 |
| 2012/0106923 A1 | 5/2012 | Wada |
| 2012/0140148 A1 | 6/2012 | Kadowaki |
| 2013/0052942 A1 | 2/2013 | Maddah-Ali |
| 2013/0153534 A1 | 6/2013 | Resnick et al. |

FOREIGN PATENT DOCUMENTS

| KR | 10-2005-0011875 | 1/2005 |
| KR | 10-2011-0037178 | 4/2011 |
| KR | 10-2011-0070569 | 6/2011 |

* cited by examiner

*Primary Examiner* — Edward J Glick
*Assistant Examiner* — David Y Chung
(74) *Attorney, Agent, or Firm* — H.C. Park & Associates, PLC

(57) ABSTRACT

A display panel including a plurality of pixels. Each of the pixels includes a light blocking part configured to define a first opening, a second opening, and a third opening, a first color filter which overlaps the first opening, a second color filter which overlaps the second opening and having a green color, a third color filter which overlaps the third opening, and a wire grid polarizer including a first stitch line spaced apart from the second opening in a plan view.

11 Claims, 11 Drawing Sheets

DISPLAY PANEL

CROSS-REFERENCE TO RELATED APPLICATION

This application claims priority from and the benefit of Korean Patent Application No. 10-2015-0058051, filed on Apr. 24, 2015, which is hereby incorporated by reference for all purposes as if fully set forth herein.

BACKGROUND

Field

Exemplary embodiments relate to a display panel. More particularly, exemplary embodiments relate to a display panel including a large area wire grid polarizer.

Discussion of the Background

Recently, a display apparatus having light weight and small size has been manufactured. A cathode ray tube (CRT) display apparatus has been commonly used in the past as a result of performance and price advantages. However, the CRT display suffers from disadvantages such as a relatively large size and lack of portability. Therefore, various newer types of display apparatuses, such as such as plasma displays, liquid crystal displays, and organic light emitting displays, have recently increased in popularity as a result of their smaller sizes, lighter weighs, and relatively low-power-consumption.

The display apparatus may include a large area wire grid polarizer in order to manufacture a large display apparatus. The large area wire grid polarizer may have a stitch line because of manufacturing processes, thereby resulting in decreased display quality.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display apparatus having a large area wire grid polarizer and capable of improving display quality.

Additional aspects will be set forth in the detailed description which follows, and, in part, will be apparent from the disclosure, or may be learned by practice of the inventive concept.

An exemplary embodiment discloses a display panel including plurality of pixels. Each of the pixel includes a light blocking part configured to define a first opening, a second opening and a third opening, a first color filter which overlaps the first opening, a second color filter which overlaps the second opening and has green color, a third color filter which overlaps the third opening, and a wire grid polarizer including a first stitch line which is spaced apart from the second opening in a plan view.

An exemplary embodiment also discloses a display panel including a color filter having red, green, or blue color, a light blocking part surrounding the color filter, and a wire grid polarizer having a plurality of areas in which wire grids are formed and a stitch line formed between the areas. The stitch line overlaps the color filter having the red or the blue color.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
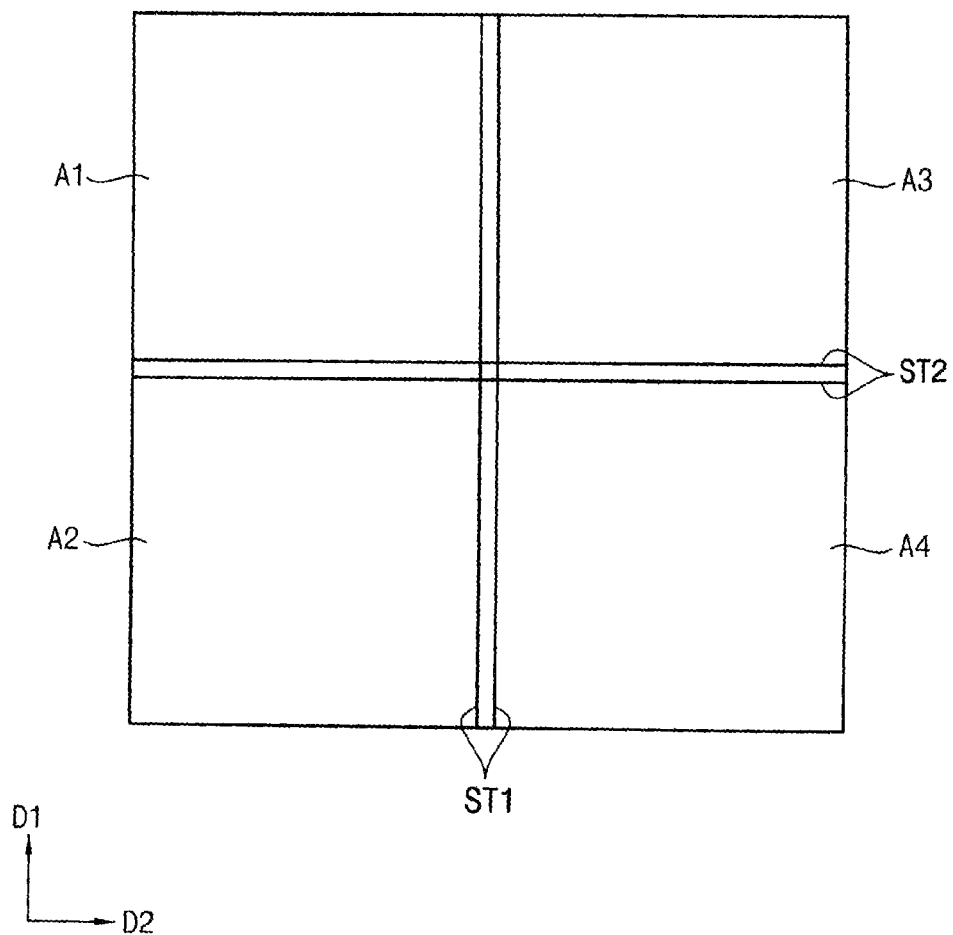
FIG. 1 is a plan view illustrating a wire grid polarizer included in a display panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a plan view illustrating a wire grid polarizer included in a display panel according to an exemplary embodiment of the inventive concept.

Referring to FIG. 1, the wire grid polarizer may include a plurality of areas. Thus, the wire grid polarizer may include a first area A1, a second area A2, a third area A3 and a fourth area A4.

A wire grid which performs a polarizing function may be formed in the first to fourth areas A1 to A4. For example, a plurality of wire grids extending in a first direction D1 and arranged in a second direction D2 may be formed in the first to fourth areas A1 to A. The second direction D2 may be substantially perpendicular to the first direction D1.

The first to fourth areas A1 to A4 may be arranged in a matrix form. A stitch line may be formed between the first to fourth areas A1 to A4. For example, the stitch line may include a first stitch line ST1 and a second stitch line ST2.

The first stitch line ST1 may be formed between the first area A1 and the third area A3, which is adjacent to the first area A1 in the second direction D2, and between the second area A2 and the fourth area A4 which is adjacent to the second area A2 in the second direction D2. The second stitch line ST2 may be formed between the first area A1 and the second area A2 which is adjacent to the first area A1 in the first direction D1, and between the third area A3 and the fourth area which is adjacent to the third area A3 in the first direction D1.

The first and second stitch lines ST1 and ST2 may be formed while the wire grid polarizer is formed. For example, the wire grid polarizer having a large size may be formed by a method such as repeating a plurality of nano-imprint lithography process, repeating a plurality of photo lithography, etc. For example, the wire grid polarizer may be formed in the first area A1 by the nano-imprint lithography process, and then the wire grid polarizer may be formed in the third area A3, which is adjacent to the first area A1, by the nano-imprint lithography process. Here, the first stitch line ST1 where the wire grids may not uniformly formed may be formed at a boundary between the first area A1 and the third area A3.

Although not shown in the figures, the stitch line may have various shapes according to the areas of the wire grid polarizer. For example, the stitch line may have a hexagonal shape, triangular shape, and etc. For example, when the wire grid polarizer is formed by the nano-imprint lithography process in the areas, the area may have various shapes, such as a hexagonal shape, triangular shape, and etc.

Each of the plurality of areas of the wire grid polarizer may have a diagonal length less than 12 inches. For example, sizes of the first to fourth areas A1 to A4 may be substantially the same as each other, and each of the first to fourth areas may have a diagonal length less than 12 inches.

Generally, it is difficult to manufacture a large area wire grid polarizer having a diagonal length greater than 12 inches by using by a nano-imprint lithography process using a master template formed by a 12-inch wafer. Thus, the large area wire grid polarizer may be formed by repeating the nano-imprint lithography process in a plurality of areas. Accordingly, the large wire grid polarizer may have may have a diagonal length greater than 12 inches. The large area wire grid polarizer may have the plurality areas, each of which has a diagonal length smaller than 12 inches. Thus, a stitch line which cannot perform a polarizing function may be formed between the areas.

Figure 2:
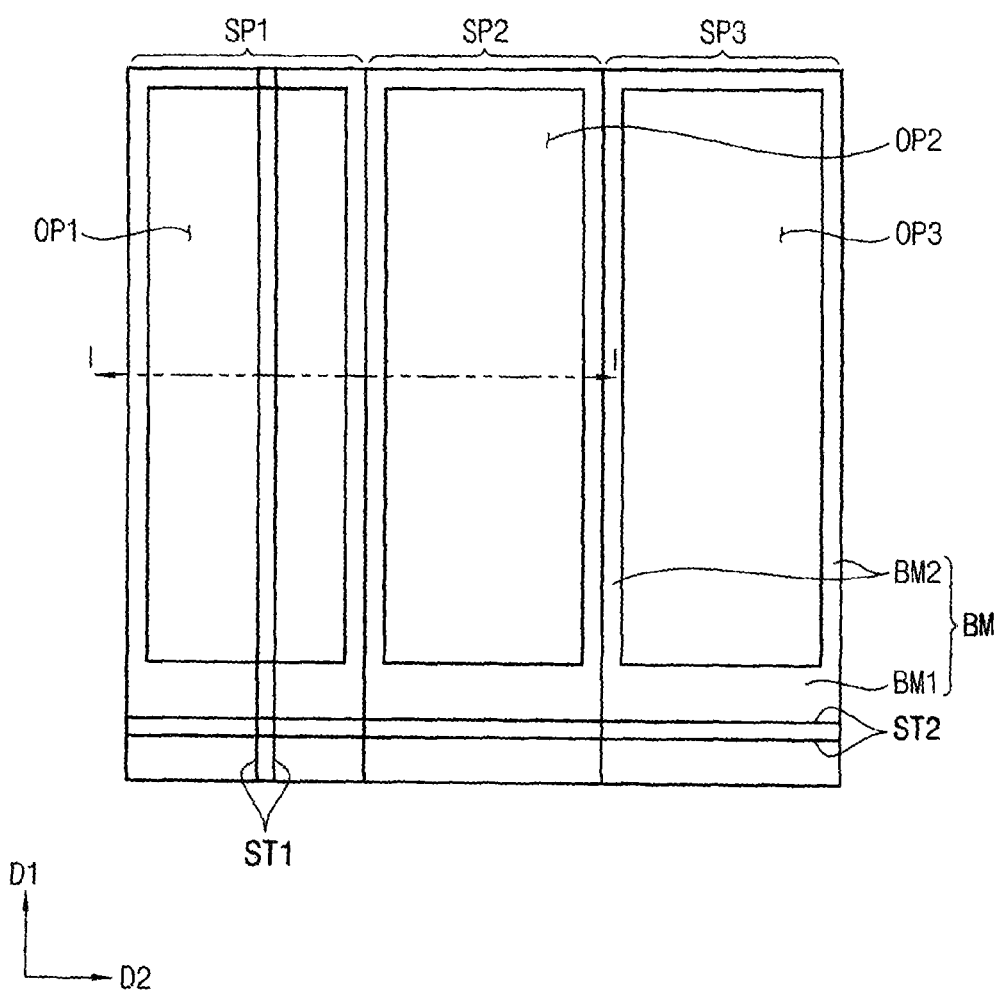
FIG. 2 is a plan view illustrating a pixel of a display panel according to an exemplary embodiment.

FIG. 2 is a plan view illustrating a pixel of a display panel according to an exemplary embodiment of the inventive concept.

Referring to FIG. 2, the display panel may include a plurality of pixels. Each of the pixels may include a first sub-pixel SP1, a second sub-pixel SP2, and a third sub-pixel SP3. The display panel may include a light blocking part BM and first to third color filter (refer to "CF" in FIG. 3). The light blocking part BM may define a first opening OP1, a second opening OP2, and a third opening OP3.

The first sub-pixel SP1, the second sub-pixel SP2, and the third sub-pixel SP3 may be arranged in a second direction D2, which is substantially perpendicular to a first direction D1.

The light blocking part BM may define the first opening OP1 in the first sub-pixel SP1, the second opening OP2 in the second sub-pixel SP2, and the third opening OP3 in the third sub-pixel SP3. The light blocking part BM may include a first light blocking portion BM1, which extends in the second direction D2, and a second light blocking portion BM2, which is disposed between the first and second openings OP1 and OP2 and between the second and third openings OP2 and OP3, and extends in the first direction D1.

The first light blocking portion BM1 may overlap a thin film transistor circuit configure to drive the first to third sub-pixels SP1, SP2, and SP3. The second light blocking portion BM2 may overlap a circuit which extends in the first direction D1. For example, the second light blocking portion BM2 may overlap a data line which extends in the first direction D1.

The first color filter may overlap the first opening OP1 of the first sub-pixel SP1, the second color filter may overlap the second opening OP2 of the second sub-pixel SP2, and the third color filter may overlap the third opening OP3 of the third sub-pixel SP3. In an exemplary embodiment, the first color filter may have a red color, the second color filter may have a green color, and the third color filter may have a blue color. For example, the first color filter may have a blue color, the second color filter may have a green color, and the third color filter may have a red color.

The wire grid polarizer may include a plurality of areas in which a plurality of wire grids are formed with a stitch line formed between each of the areas. The wire grid polarizer may be substantially same as the wire gird polarizer of FIG. 1. For example, the wire grid polarizer may include a first stitch line ST1, which extends in the first direction D1, and a second stitch line ST2, which extends in the second direction D2.

The wire grids of the wire grid polarizer may have a pitch about 50 nm (nanometers) to 150 nm, where pitch may be defined as a sum of a width of the wire grid and a distance between the adjacent wire grids.

The first stitch line ST1 may overlap the first opening OP1 and the light blocking part BM. For example, the first stitch line ST1 may overlap the first light blocking portion BM1. In addition, the first stitch line ST1 may not overlap the second opening OP2. In a plan view, the first stitch line ST1 may be spaced apart from the second opening OP2, which overlaps the second color filter having the green color. Thus, the first stitch line ST1 need not overlap the second color filter having the green color.

When the first stitch line ST1 overlaps the first opening OP1, the first stitch line ST1 may have a width less than 3 um (micrometers), so that the first stitch line ST1 may be invisible to a user. The first stitch line ST1 may have a width the same as that of the wire grid of the wire grid polarizer. Thus, the first stitch line ST1 may have a width greater than the width of the wire grid of the wire grid polarizer, and less than 3 um. For example, the first stitch line ST1 may have a width of about 25 nm to about 3 um.

The second stitch line ST2 may overlap the first light blocking portion BM1. The first light blocking portion BM1 may overlap the thin film transistor circuit. Generally, a wire width of the thin film transistor circuit may greater than the second stitch line ST2, so that the second stitch line ST2 may be essentially invisible to a user.

According to the exemplary embodiments of the present inventive concept, a display panel includes a wire grid polarizer having a first stitch line and a second stitch line, and the first stitch line is spaced apart from a second opening which overlaps a second color filter having a green color. Although the wire grid polarizer has a larger area as a result of the display panel having a larger size, the first stitch line may be essentially invisible to a user. Accordingly, display quality of a display apparatus having a large area wire grid polarizer may be improved.

Figure 3A:
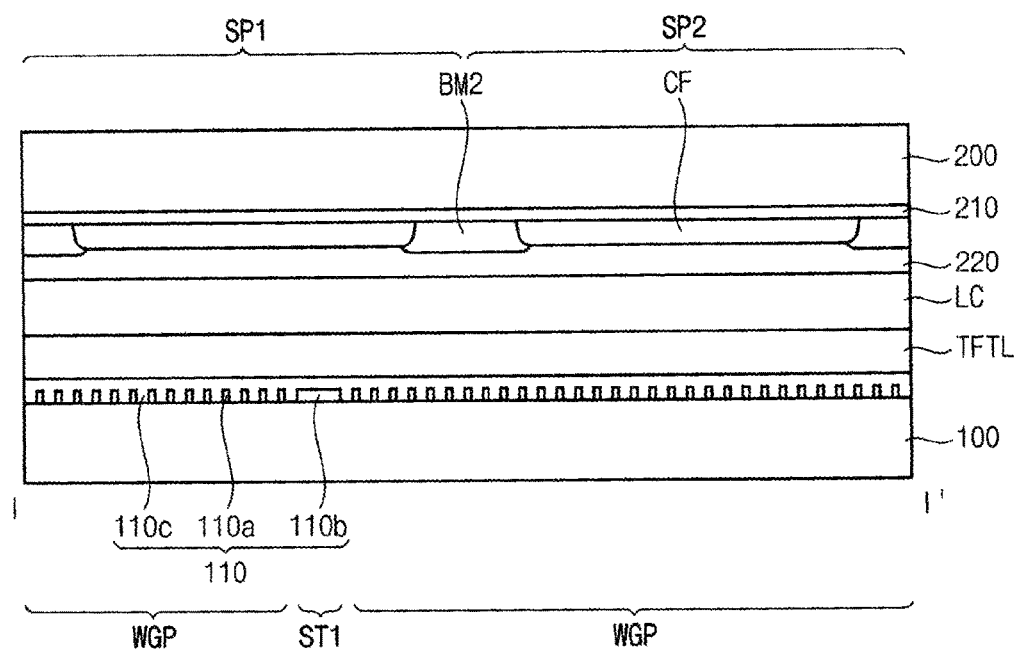
FIG. 3A is a cross-sectional view taken along a line I-I' of the display panel of FIG. 2.

FIG. 3A is a cross-sectional view taken along a line I-I' of the display panel of FIG. 2.

Referring to FIG. 3A, the display panel may include a lower substrate, an upper substrate, and a liquid crystal layer LC disposed between the lower substrate and the upper substrate. The lower substrate may include a first base substrate 100, a first polarizer 110, and a thin film transistor layer TFTL. The upper substrate may include a second base substrate 200, a second polarizer 210, first to third color filters CF, a light blocking part, and an over-coating layer 220.

The first base substrate 100 may include a material which has relatively high transmittance, thermal resistance, and chemical resistance. For example the first base substrate 100 may include any one selected from the group consisting of glass, polyethylenenaphthalate, polyethylene terephthalate, polyacryl and a mixture thereof.

The first polarizer 110 may be disposed on the first base substrate 100. The first polarizer 110 may include a plurality of areas WGP in which a plurality of wire grids is formed and a first stitch line ST1 formed between the areas. The first polarizer 110 may be substantially same as the wire grid polarizer of FIG. 1.

The wire grids of the first polarizer 110 may have a pitch about 50 nm to 150 nm. The pitch may be defined as sum of width of one of the wire grid and a distance between the wire grids adjacent each other.

The first stitch line ST1 may be a pattern 110b formed between the wire grids of the first polarizer 110, which are adjacent to each other. The width of the first stitch line ST1 may be greater than the width of one of the wire grids of the first polarizer 110 and less than 3 um.

The first stitch line ST1 may be overlapped with a first color filter CF of the first sub-pixel SP1. In addition, the first stitch line ST1 may not overlap a second color filter CF of the second sub-pixel SP2. In a plan view, the first stitch line ST1 may be spaced apart from the second color filter having a green color.

The first polarizer 110 may further include an insulation layer 110c disposed on the first base substrate 100 on which the wire grids 110a and the pattern 110b are disposed. The insulation layer 110c may include inorganic material, such as silicon nitride ($SiN_x$) and silicon oxide ($SiO_x$), or organic material. In addition, the insulation layer 110c may have a single layer structure or a multi-layer structure having organic and/or inorganic material.

The thin film transistor layer TFTL may be disposed on the first base substrate 100 on which the first polarizer 110 is disposed. The thin film transistor layer TFTL may include a thin film transistor circuit having a thin film transistor to first to third sub-pixels SP1, SP2, and SP3. For example, the thin film transistor layer TFTL may include the thin film transistor including a gate electrode, a source electrode, and a drain electrode, a gate line, and a data line crossing the gate line.

The second base substrate 200 may face the base substrate 100. The second base substrate 200 may include a material which has relatively high transmittance, thermal resistance, and chemical resistance. For example, the second base substrate 200 may include any one selected from the group consisting of glass, polyethylenenaphthalate, polyethylene terephthalate, polyacryl, and a mixture thereof.

The second polarizer 210 may be disposed on the second base substrate 200. The second polarizer 210 may include a plurality of areas in which a plurality of wire grids are formed, and a first stitch line formed between the areas. The second polarizer 210 may be substantially the same as the wire grid polarizer of FIG. 1. A polarizing axis of the second polarizer 210 may be substantially perpendicular to a polarizing axis of the first polarizer 110.

The second polarizer 210 may have a pitch about 50 nm to 150 nm. The pitch may be defined as sum of a width of one of the wire grids and a distance between the wire grids adjacent each other.

The first stitch line may be a pattern formed between the wire grids of the second polarizer 210 which are adjacent to each other. The width of the first stitch line may be greater than the width of one of the wire grids of the second polarizer 210 and less than 3 um.

The first stitch line may be overlapped with the first color filter CF of the first sub-pixel SP1. In addition, the first stitch line may not overlap the second color filter CF of the second sub-pixel SP2. In a plan view, the first stitch line may be spaced apart from the second color filter, which has green color.

The second polarizer 210 may further include an insulation layer disposed on the second base substrate 200 on which the wire grids and the pattern are disposed. The insulation layer may include inorganic material such as silicon nitride ($SiN_x$) and silicon oxide ($SiO_x$), or organic material. In addition, the insulation layer may have a single layer structure or a multi-layer structure having organic and/or inorganic material.

The first to third color filters CF may be disposed on the second base substrate 200 on which the second polarizer 210 is disposed. The first to third color filters CF may supply colors to light passing through the liquid crystal layer LC. Each of the first to third color filter CF may have a color different from a color of color filter of adjacent pixels. The first to third color filter CF may be overlapped with adjacent color filter CF in a boundary of a pixel area. In addition, the first to third color filter CF may be spaced apart from adjacent color filter CF in the boundary of the pixel area.

The first color filter may overlap a first opening of the first sub-pixel SP1, the second color filter may overlap a second opening of the second sub-pixel SP2, and the third color filter may overlap a third opening of the third sub-pixel SP3. For example, the first color filter may have red color, the second color filter may have green color, and the third color filter may have blue color. In another example, the first color filter may have blue color, the second color filter may have green color, and the third color filter may have red color.

The light blocking part may be disposed on the second base substrate 200 on which the first to third color filters CF are disposed. The light blocking part may block light. The light blocking part may define the first opening in the first sub-pixel SP1, define the second opening in the second sub-pixel SP2, and define the third opening in the third sub-pixel SP3. The light blocking part may include a first light blocking portion (refer to BM1 of FIG. 2) which extends in a first direction (refers to D1 of FIG. 2) and a second light blocking portion BM2 which is disposed between the first and second openings and between the second and third openings and extends in a second direction (refers to D2 of FIG. 2).

The over-coating layer 220 may be disposed on the first to third color filters CF and the light blocking part. The over-coating layer 220 may flatten the first to third color filters CF, protect the first to third color filters CF, and insulate the first to third color filters CF. The over-coating layer 220 may include acrylic-epoxy material. In addition, a common electrode may be further formed on the over-coating layer to apply an electric field to the liquid crystal layer LC.

The liquid crystal layer LC may be disposed between the lower substrate and the upper substrate. The liquid crystal layer LC may include liquid crystal molecules having optical anisotropy. The liquid crystal molecules may be driven by electric field, so that an image may be displayed by passing or blocking light through the liquid crystal layer LC.

Figure 3B:
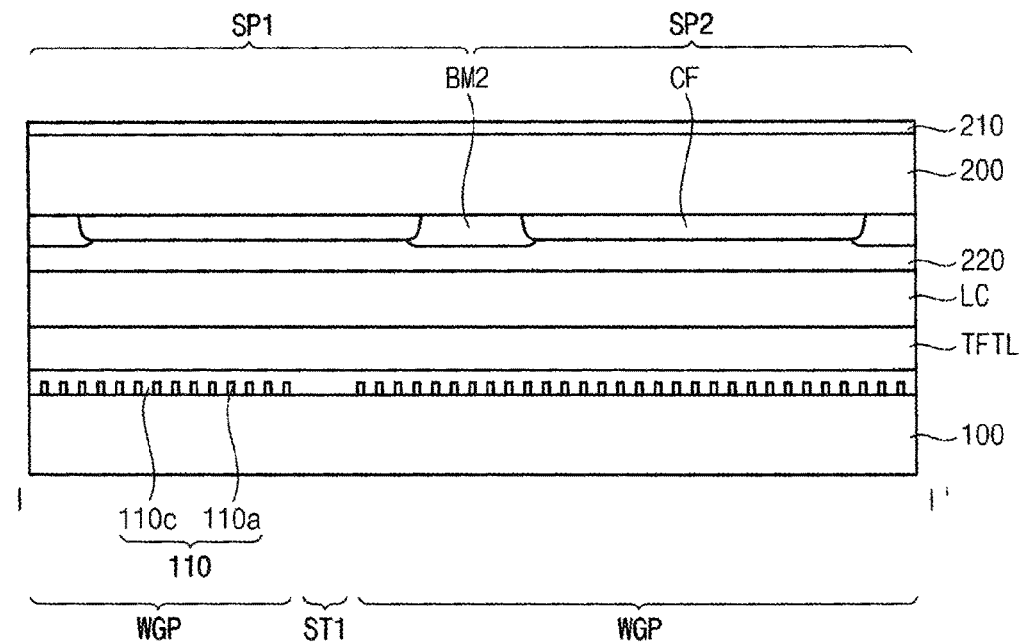
FIG. 3B is a cross-sectional view taken along a line I-I' of the display panel of FIG. 2.

FIG. 3B is a cross-sectional view taken along a line I-I' of FIG. 2 according to an exemplary embodiment of the inventive concept.

Referring to FIG. 3B, the display panel may substantially same as a display panel of FIG. 3A except for a first polarizer 110. Thus, any further detailed descriptions concerning the same elements will be omitted or briefly described.

The display panel may include a lower substrate, an upper substrate, and a liquid crystal layer LC disposed between the lower substrate and the upper substrate. The lower substrate may include a first base substrate 100, a first polarizer 110, and a thin film transistor layer TFTL. The upper substrate may include a second base substrate 200, a second polarizer 210, first to third color filter CF, a light blocking part, and an over-coating layer 220.

The first polarizer 110 may be disposed on the first base substrate 100. The first polarizer 110 may include a plurality of areas WGP in which a plurality of wire grids are formed, and a first stitch line ST1 formed between the areas. The first polarizer 110 may be substantially the same as the wire grid polarizer of FIG. 1.

The wire grids of the first polarizer 110 may have a pitch about 50 nm to 150 nm.

The first stitch line ST1 may be an opening defined by the wire grids of the first polarizer 110, which are adjacent to first stitch line ST1. The width of the first stitch line ST1 may be greater than the width of one of the wire grids of the first polarizer 110 and less than 3 um.

The first stitch line ST1 may be overlapped with a first color filter CF of the first sub-pixel SP1. In addition, the first stitch line ST1 may not overlap a second color filter CF of the second sub-pixel SP2. In a plan view, the first stitch line ST1 may be spaced apart from the second color filter, which has a green color.

The first polarizer 110 may further include an insulation layer 110c disposed on the first base substrate 100 on which the wire grids 110a are disposed.

The thin film transistor layer TFTL may be disposed on the first base substrate 100 on which the first polarizer 110 is disposed. The thin film transistor layer TFTL may include a thin film transistor circuit having a thin film transistor to first to third sub-pixels SP1, SP2, and SP3.

The second base substrate 200 may face the base substrate 100.

The second polarizer 210 may be disposed on the second base substrate 200. The second polarizer 210 may include a plurality of areas in which a plurality of wire grids are formed, and a first stitch line formed between the areas. The second polarizer 210 may be substantially same as the wire grid polarizer of FIG. 1. A polarizing axis of the second polarizer 210 may be substantially perpendicular to a polarizing axis of the first polarizer 110.

The second polarizer 210 may have a pitch about 50 nm to 150 nm.

The first stitch line may be a pattern formed between the wire grids of the second polarizer 210 which are adjacent to each other. The width of the first stitch line may be greater than the width of one of the wire grids of the second polarizer 210 and less than 3 um.

The first stitch line may be overlapped with the first color filter CF of the first sub-pixel SP1. In addition, the first stitch line may not overlap the second color filter CF of the second sub-pixel SP2. In a plan view, the first stitch line may be spaced apart from the second color filter, which has a green color.

The second polarizer 210 may further include an insulation layer disposed on the second base substrate 200 on which the wire grids and the pattern are disposed.

The first to third color filters CF may be disposed on the second base substrate 200 on which the second polarizer 210 is disposed. The first to third color filter CF may supply colors to light passing through the liquid crystal layer LC. Each of the first to third color filter CF may have a color different from a color of color filter of adjacent pixels.

The first color filter may overlap a first opening of the first sub-pixel SP1, the second color filter may overlap a second opening of the second sub-pixel SP2, and the third color filter may overlap a third opening of the third sub-pixel SP3. In one example, the first color filter may have a red color, the second color filter may have a green color, and the third color filter may have a blue color. In another example, the first color filter may have a blue color, the second color filter may have a green color, and the third color filter may have a red color.

The light blocking part may be disposed on the second base substrate 200 on which the first to third color filters CF are disposed. The light blocking part may block light. The light blocking part BM may define the first opening in the first sub-pixel SP1, define the second opening in the second sub-pixel SP2, and define the third opening in the third sub-pixel SP3. The light blocking part may include a first light blocking portion (refer to "BM1" of FIG. 2) which extends in a second direction (refer to D2 of FIG. 2) and a second light blocking portion BM2 which is disposed between the first and second openings and between the second and third openings and extends in a first direction (refer to D1 of FIG. 2).

The over-coating layer 220 may be disposed on the first to third color filters CF and the light blocking part. In addition, a common electrode may be further formed on the over-coating layer to apply an electric field to the liquid crystal layer LC.

The liquid crystal layer LC may be disposed between the lower substrate and the upper substrate. The liquid crystal layer LC may include liquid crystal molecules having optical anisotropy. The liquid crystal molecules may be driven by electric field, so that an image may be displayed by passing or blocking light through the liquid crystal layer LC.

Figure 4:
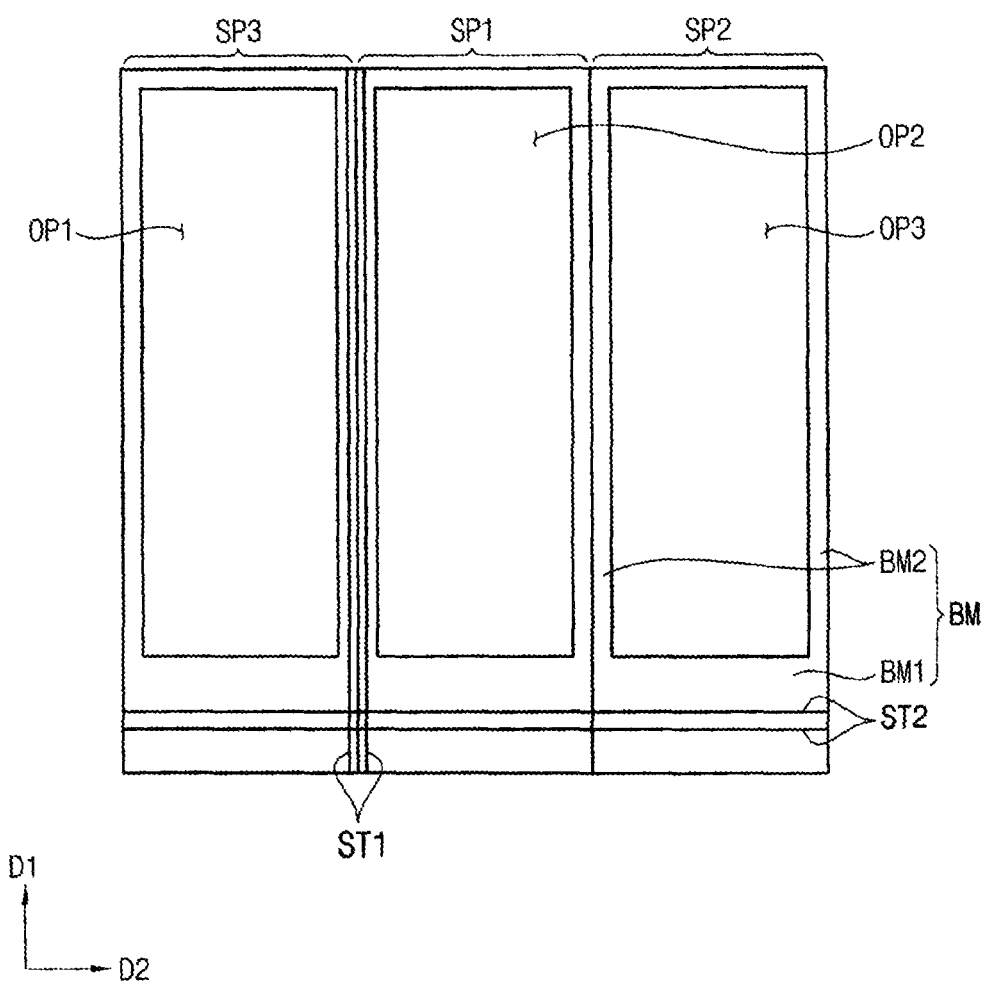
FIG. 4 is a plan view illustrating a portion of adjacent two pixels of a display panel according to an exemplary embodiment.

FIG. 4 is a plan view illustrating a portion of adjacent two pixels of a display panel according to an exemplary embodiment of the inventive concept.

Referring to FIG. 4, the display panel may include a plurality of pixels. Each of the pixels may include a first sub-pixel SP1, a second sub-pixel SP2, and a third sub-pixel SP3. The display panel may include a light blocking part BM and first to third color filters (refers to "CF" in FIG. 3). The light blocking part BM may define a first opening OP1, a second opening OP2, and a third opening OP3.

The first sub-pixel SP1 and the second sub-pixel SP2 of one pixel and the third sub-pixel SP3 of another pixel adjacent to the one pixel are illustrated in the figure.

The first sub-pixel SP1, the second sub-pixel SP2, and the third sub-pixel SP3 of the adjacent pixel may be arranged in a second direction D2, which is substantially perpendicular to a first direction D1.

The light blocking part BM may define the first opening OP1 in the first sub-pixel SP1, define the second opening OP2 in the second sub-pixel SP2, and define the third opening OP3 in the third sub-pixel SP3 of the adjacent pixel. The light blocking part BM may include a first light blocking portion BM1, which extends in the second direction D2, and a second light blocking portion BM2, which is disposed between the first and second openings OP1 and OP2 and between the second and third openings OP2 and OP3, and extends in the first direction D1.

The first light blocking portion BM1 may overlap a thin film transistor circuit configured to drive the first to third sub-pixels SP1, SP2, and SP3. The second light blocking portion BM2 may overlap a circuit which extends in the first direction D1. For example, the second the second light blocking portion BM2 may overlap a data line which extends in the first direction D1.

The first color filter may overlap the first opening OP1 of the first sub-pixel SP1, the second color filter may overlap the second opening OP2 of the second sub-pixel SP2, and the third color filter of the adjacent pixel may overlap the third opening OP3 of the third sub-pixel SP3 of the adjacent pixel. In one example, the first color filter may have a red color, the second color filter may have a green color, and the third color filter may have a blue color. In another example, the first color filter may have a blue color, the second color filter may have a green color, and the third color filter may have a red color.

The wire grid polarizer may include a plurality of areas in which a plurality of wire grids are formed, and a stitch line between the areas. The wire grid polarizer may be substantially the same as the wire gird polarizer of FIG. 1. For example, the wire grid polarizer may include a first stitch line ST1, which extends in the first direction D1, and a second stitch line ST2, which extends in the second direction D2.

The wire grids of the wire grid polarizer may have a pitch about 50 nm to 150 nm. The pitch may be defined as a sum of a width of the wire grid and a distance between the adjacent wire grids.

The first stitch line ST1 may overlap the light blocking part BM. For example, the first stitch line ST1 may overlap the second light blocking portion BM2, which is disposed between the first opening OP1 and the second opening OP2 of the adjacent pixel. In addition, the first stitch line ST1 may not overlap the second opening OP2. In a plan view, the first stitch line ST1 may be spaced apart from the second opening OP2, which overlaps the second color filter having the green color. Thus, the first stitch line ST1 may not overlap the second color filter having the green color, and be disposed between the first opening OP1 and the second opening OP2 of the adjacent pixel.

The first stitch line ST1 may be overlapped by the second light blocking portion BM2, so that the first stitch line ST1 may be invisible to a user. In addition, the first stitch line ST1 may be disposed between the first opening OP1 and the second opening OP2 of the adjacent pixel. Thus, although the second light blocking portion BM2 and the first stitch line ST1 may partially overlap the first opening OP1 or the second opening OP2 of the adjacent pixel due to misalignment of the second light blocking portion BM2 and the first stitch line ST1, the first stitch line ST1 may be spaced apart from the third opening OP3.

The second stitch line ST2 may overlap the first light blocking portion BM1. The first light blocking portion BM1 may overlap the thin film transistor circuit. Generally, a line width of the thin film transistor circuit may be greater than width of the second stitch line ST2, so that the second stitch line ST2 may be invisible to a user.

Figure 5:
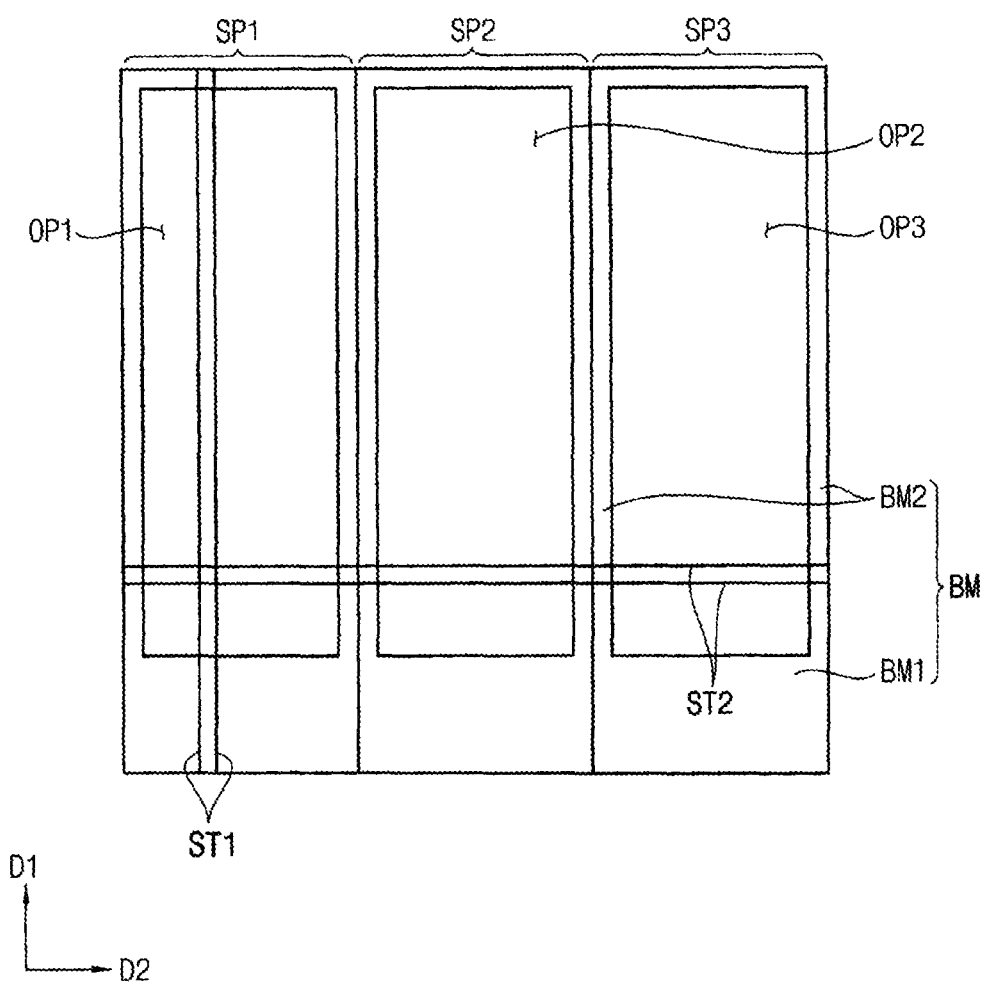
FIG. 5 is a plan view illustrating a pixel of a display panel according to an exemplary embodiment.

FIG. 5 is a plan view illustrating a pixel of a display panel according to an exemplary embodiment of the inventive concept.

Referring to FIG. 5, the display panel may substantially same as a display panel of FIG. 2 except for a second stitch line ST2. Thus, any further detailed descriptions concerning the same elements will be omitted or briefly described.

The display panel may include a plurality of pixels. Each of the pixels may include a first sub-pixel SP1, a second sub-pixel SP2, and a third sub-pixel SP3. The display panel may include a light blocking part BM and first to third color filter (refers to CF in FIG. 3). The light blocking part BM may define a first opening OP1, a second opening OP2, and a third opening OP3.

The first sub-pixel SP1, the second sub-pixel SP2, and the third sub-pixel SP3 may be arranged in a second direction D2, which is substantially perpendicular to a first direction D1.

The light blocking part BM may define the first opening OP1 in the first sub-pixel SP1, the second opening OP2 in the second sub-pixel SP2, and the third opening OP3 in the third sub-pixel SP3. The light blocking part BM may include a first light blocking portion BM1, which extends in the second direction D2 and a second light blocking portion BM2, which is disposed between the first and second openings OP1 and OP2 and between the second and third openings OP2 and OP3, and extends in the first direction D1.

The first light blocking portion BM1 may overlap a thin film transistor circuit configure to drive the first to third sub-pixels SP1, SP2, and SP3. The second light blocking portion BM2 may overlap a circuit which extends in the first direction D1.

The first color filter may overlap the first opening OP1 of the first sub-pixel SP1, the second color filter may overlap the second opening OP2 of the second sub-pixel SP2, and the third color filter may overlap the third opening OP3 of the third sub-pixel SP3. In one example, the first color filter may have a red color, the second color filter may have a green color, and the third color filter may have a blue color. In another example, the first color filter may have a blue color, the second color filter may have a green color, and the third color filter may have a red color.

The wire grid polarizer may include a plurality of areas in which a plurality of wire grids are formed and a stitch line between the areas. The wire grid polarizer may be substantially the same as the wire gird polarizer of FIG. 1. For example, the wire grid polarizer may include a first stitch line ST1, which extends in the first direction D1, and a second stitch line ST2, which extends in the second direction D2.

The wire grids of the wire grid polarizer may have a pitch about 50 nm to 150 nm.

The first stitch line ST1 may overlap the first opening OP1. The first stitch line ST1 may overlap the light blocking part BM. In addition, the first stitch line ST1 may not overlap the second opening OP2. In a plan view, the first stitch line ST1 may be spaced apart from the second opening OP2 which overlaps the second color filter having the green color. Thus, the first stitch line ST1 may not overlap the second color filter having the green color.

The first stitch line ST1 may have a width greater than a width of the wire grid and less than 3 um.

The second stitch line ST2 may overlap the first opening OP1, the second opening OP2, and the third opening OP3. The second stitch line ST2 may affect all of the first sub-pixel SP1, the second sub-pixel SP2, and the third sub-pixel SP3, so that the second stitch line ST2 may be less visible than the first stitch line ST1, which may affect only one sub-pixel. The second stitch line ST2 may have a width less than 3 um to be invisible to a user. The second stitch line ST2 may be formed in a direction which is substantially perpendicular to an extending direction of the wire grid.

Figure 6:
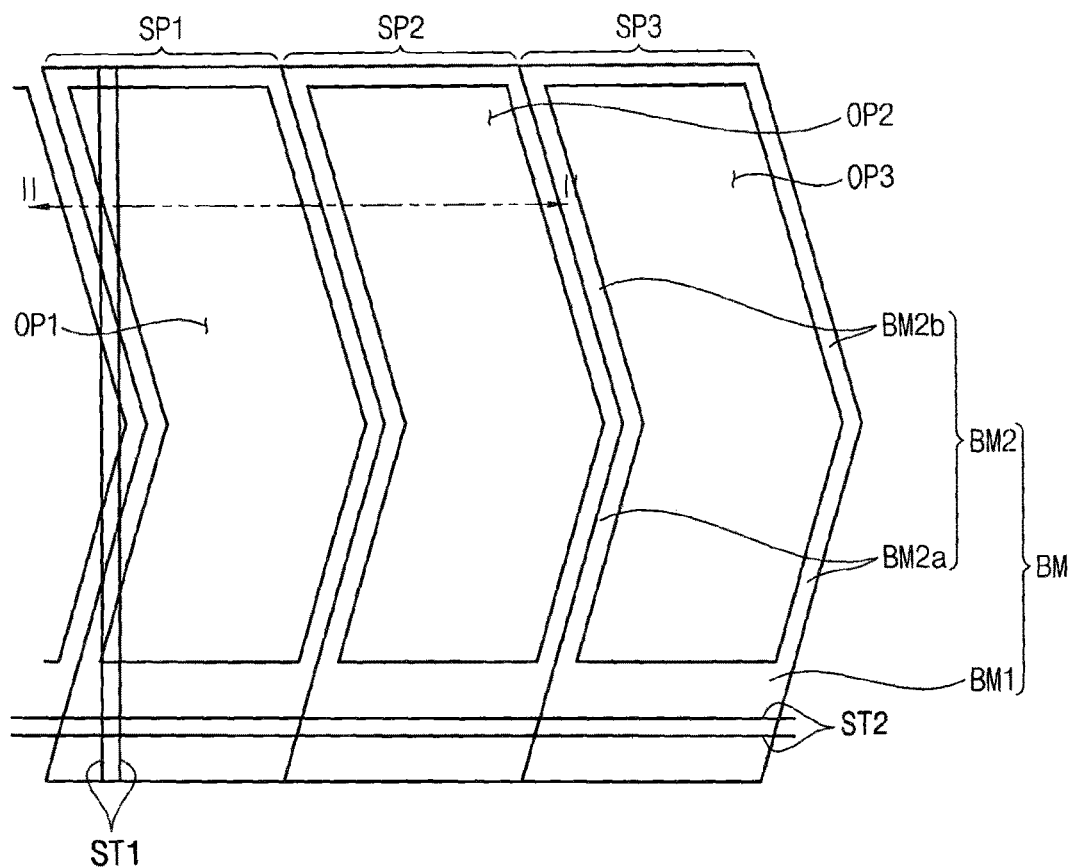
FIG. 6 is a plan view illustrating a pixel of a display panel according to an exemplary embodiment.

FIG. 6 is a plan view illustrating a pixel of a display panel according to an exemplary embodiment of the inventive concept.

Referring to FIG. 6, the display panel may include a plurality of pixels. Each of the pixels may include a first sub-pixel SP1, a second sub-pixel SP2, and a third sub-pixel SP3. The display panel may include a light blocking part BM and first to third color filter (refer to "CF" in FIG. 7). The light blocking part BM may define a first opening OP1, a second opening OP2, and a third opening OP3.

The first sub-pixel SP1, the second sub-pixel SP2, and the third sub-pixel SP3 may be arranged in a second direction D2, which is substantially perpendicular to a first direction D1.

The light blocking part BM may define the first opening OP1 in the first sub-pixel SP1, the second opening OP2 in the second sub-pixel SP2, and the third opening OP3 in the third sub-pixel SP3. The light blocking part BM may include a first light blocking portion BM1, which extends in the second direction D2, and a second light blocking portion BM2, which is disposed between the first and second openings OP1 and OP2 and between the second and third openings OP2 and OP3, and extends in the first direction D1.

The second light blocking portion BM2 may include a first portion BM2$a$, which extends in a third direction D3 and which makes a negative acute angle with the first direction D1, and a second portion BM2$b$, which extends in a fourth direction D4 and which makes a positive acute angle with the first direction D1.

The first light blocking portion BM1 may overlap a thin film transistor circuit configure to drive the first to third sub-pixels SP1, SP2, and SP3. The second light blocking portion BM2 may overlap a circuit which extends in the first direction D1. For example, the second light blocking portion BM2 may overlap a data line which extends in the first direction D1.

The first color filter may overlap the first opening OP1 of the first sub-pixel SP1, the second color filter may overlap the second opening OP2 of the second sub-pixel SP2, and the third color filter may overlap the third opening OP3 of the third sub-pixel SP3. In one example, the first color filter may have a red color, the second color filter may have a green color, and the third color filter may have a blue color. In another example, the first color filter may have a blue color, the second color filter may have a green color, and the third color filter may have a red color.

The wire grid polarizer may include a plurality of areas in which a plurality of wire grids are formed and a stitch line between the areas. The wire grid polarizer may be substantially the same as the wire gird polarizer of FIG. 1. For example, the wire grid polarizer may include a first stitch line ST1, which extends in the first direction D1, and a second stitch line ST2, which extends in the second direction D2.

The wire grids of the wire grid polarizer may have a pitch about 50 nm to 150 nm. The pitch may be defined as a sum of a width of the wire grid and a distance between the adjacent wire grids.

The first stitch line ST1 may overlap the first opening OP1, the light blocking part BM, and a third opening OP3 of an adjacent pixel. For example, the first stitch line ST1 may overlap the first opening OP1, the second portion BM2b, of the second light blocking portion BM2, the third opening OP3 of the adjacent pixel and the first portion BM2a of the second light blocking portion BM2 along the first direction D1. In addition, the first stitch line ST1 may not overlap the second opening OP2. In a plan view, the first stitch line ST1 may be spaced apart from the second opening OP2, which overlaps the second color filter having the green color. Thus, the first stitch line ST1 may not overlap the second color filter having the green color.

The first stitch line ST1 may have a width less than 3 um so as to be invisible to a user. Ideally, the width of the first stitch line ST1 may be substantially the same as a width of s the wire grid of the wire grid polarizer. Thus, the first stitch line ST1 may have a width greater than the width of the wire grid of the wire grid polarizer, and less than 3 um. For example, the first stitch line ST1 may have a width greater than about 25 nm, and less than about 3 um.

The second stitch line ST2 may overlap the first light blocking portion BM1. The first light blocking portion BM1 may overlap the thin film transistor circuit. Generally, a wire width of the thin film transistor circuit may greater than the second stitch line ST2, so that the second stitch line ST2 may be invisible to a user.

Figure 7:
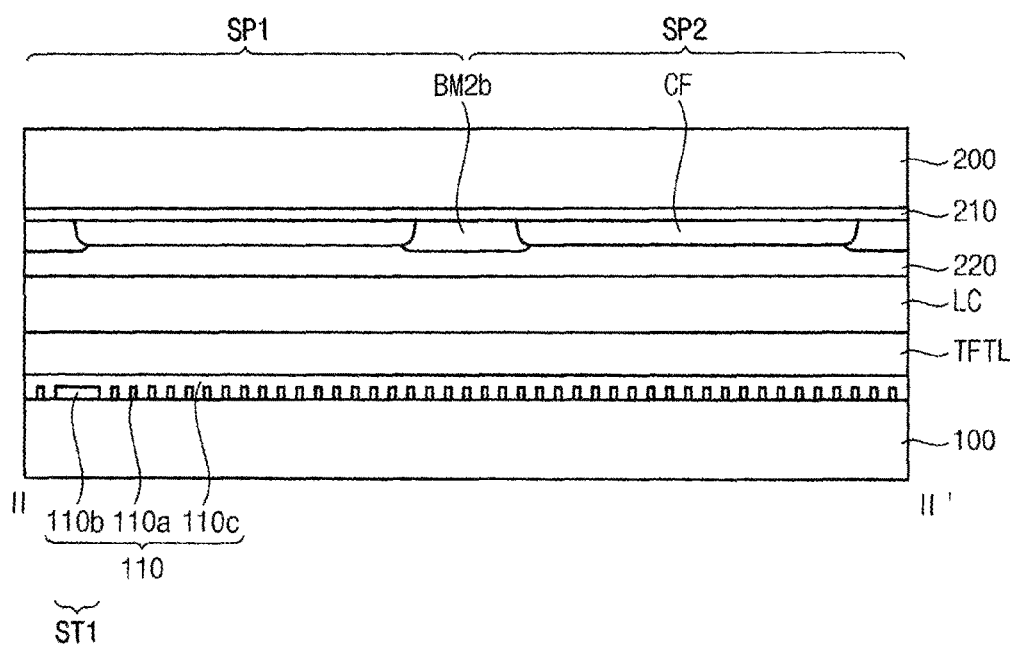
FIG. 7 is a cross-sectional view taken along a line II-II' of FIG. 6.

FIG. 7 is a cross-sectional view taken along a line II-II' of FIG. 6.

Referring to FIG. 7, the display panel may include a lower substrate, an upper substrate, and a liquid crystal layer LC disposed between the lower substrate and the upper substrate. The lower substrate may include a first base substrate 100, a first polarizer 110, and a thin film transistor layer TFTL. The upper substrate may include a second base substrate 200, a second polarizer 210, first to third color filters CF, a light blocking part, and an over-coating layer 220.

The first base substrate 100 may include a material which has relatively high transmittance, thermal resistance, and chemical resistance. For example the first base substrate 100 may include any one selected from the group consisting of glass, polyethylenenaphthalate, polyethylene terephthalate, polyacryl, and a mixture thereof.

The first polarizer 110 may be disposed on the first base substrate 100. The first polarizer 110 may include a plurality of areas WGP in which a plurality of wire grids are formed and a first stitch line ST1 formed between the areas. The first polarizer 110 may be substantially the same as the wire grid polarizer of FIG. 1.

The wire grids of the first polarizer 110 may have a pitch about 50 nm to 150 nm. The pitch may be defined as sum of width of one of the wire grids and a distance between the wire grids adjacent to each other.

The first stitch line ST1 may be a pattern 110b formed between the wire grids of the first polarizer 110 that are adjacent to each other. A width of the first stitch line ST1 may be greater than a width of one of the wire grids of the first polarizer 110 and less than 3 um.

The first stitch line ST1 may be overlapped with a first color filter CF of the first sub-pixel SP1. In addition, the first stitch line ST1 may not overlap a second color filter CF of the second sub-pixel SP2. In a plan view, the first stitch line ST1 may be spaced apart from the second color filter, which has a green color.

The first polarizer 110 may further include an insulation layer 110c disposed on the first base substrate 100 on which the wire grids 110a and the pattern 110b are disposed. The insulation layer 110c may include inorganic material such as silicon nitride ($SiN_x$) and silicon oxide ($SiO_x$), or organic material. In addition, the insulation layer 110c may have a single layer structure or a multi-layer structure having organic and/or inorganic material.

The thin film transistor layer TFTL may be disposed on the first base substrate 100 on which the first polarizer 110 is disposed. The thin film transistor layer TFTL may include a thin film transistor circuit having a thin film transistor to first to third sub-pixels SP1, SP2, and SP3. For example, the thin film transistor layer TFTL may include the thin film transistor including a gate electrode, a source electrode and a drain electrode, a gate line, a data line crossing the gate line.

The second base substrate 200 may face the base substrate 100. The second base substrate 200 may include a material which has relatively high transmittance, thermal resistance, and chemical resistance. For example the second base substrate 200 may include any one selected from the group consisting of glass, polyethylenenaphthalate, polyethylene terephthalate, polyacryl and a mixture thereof.

The second polarizer 210 may be disposed on the second base substrate 200. The second polarizer 210 may include a plurality of areas in which a plurality of wire grids are formed and a first stitch line formed between the areas. The second polarizer 210 may be substantially the same as the wire grid polarizer of FIG. 1. A polarizing axis of the second polarizer 210 may be substantially perpendicular to a polarizing axis of the first polarizer 110.

The second polarizer 210 may have a pitch about 50 nm to 150 nm.

The first stitch line may be a pattern formed between the wire grids of the second polarizer 210, which are adjacent to each other. A width of the first stitch line may be greater than a width of one of the wire grids of the second polarizer 210 and less than 3 um.

The first stitch line may be overlapped with the first color filter CF of the first sub-pixel SP1 and a first portion and a second portion BM2b of the light blocking part. In addition, the first stitch line may not overlap the second color filter CF of the second sub-pixel SP2. In a plan view, the first stitch line may be spaced apart from the second color filter, which has a green color.

The second polarizer 210 may further include an insulation layer disposed on the second base substrate 200 on which the wire grids and the pattern are disposed. The insulation layer may include inorganic material such as silicon nitride ($SiN_x$) and silicon oxide ($SiO_x$), or organic material. In addition, the insulation layer may have a single layer structure or a multi-layer structure having organic and/or inorganic material.

The first to third color filters CF may be disposed on the second base substrate 200 on which the second polarizer 210 is disposed. The first to third color filters CF may supply colors to light passing through the liquid crystal layer LC. Each of the first to third color filters CF may have a color different from a color of the color filter of adjacent pixels. The first to third color filters CF may be overlapped with adjacent color filter CF in a boundary of a pixel area. In addition, the first to third color filters CF may be spaced apart from adjacent color filter CF in the boundary of the pixel area.

The first color filter may overlap a first opening of the first sub-pixel SP1, the second color filter may overlap a second opening of the second sub-pixel SP2, and the third color filter may overlap a third opening of the third sub-pixel SP3. In one example, the first color filter may have a red color, the second color filter may have a green color, and the third color filter may have a blue color. In another example, the first color filter may have a blue color, the second color filter may have a green color, and the third color filter may have a red color.

The light blocking part may be disposed on the second base substrate 200 on which the first to third color filters CF are disposed. The light blocking part may block light. The light blocking part may define the first opening in the first sub-pixel SP1, the second opening in the second sub-pixel SP2, and the third opening in the third sub-pixel SP3. The light blocking part may include a first light blocking portion (refer to "BM1" of FIG. 2), which extends in a second direction (refer to "D2" of FIG. 2) and a second light blocking portion BM2, which is disposed between the first and second openings and between the second and third openings and extends in a first direction (refer to "D1" of FIG. 2). The second light blocking portion BM2 may include a first portion and a second portion BM2b.

The over-coating layer 220 may be disposed on the first to third color filters CF and the light blocking part. The over-coating layer 220 may flatten the first to third color filters CF, protect the first to third color filters CF, and insulate the first to third color filters CF. The over-coating layer 220 may include acrylic-epoxy material. In addition, a common electrode may be further formed on the over-coating layer to apply an electric field to the liquid crystal layer LC.

The liquid crystal layer LC may be disposed between the lower substrate and the upper substrate. The liquid crystal layer LC may include liquid crystal molecules having optical anisotropy. The liquid crystal molecules may be driven by electric field, so that an image may be displayed by passing or blocking light through the liquid crystal layer LC.

Figure 8:
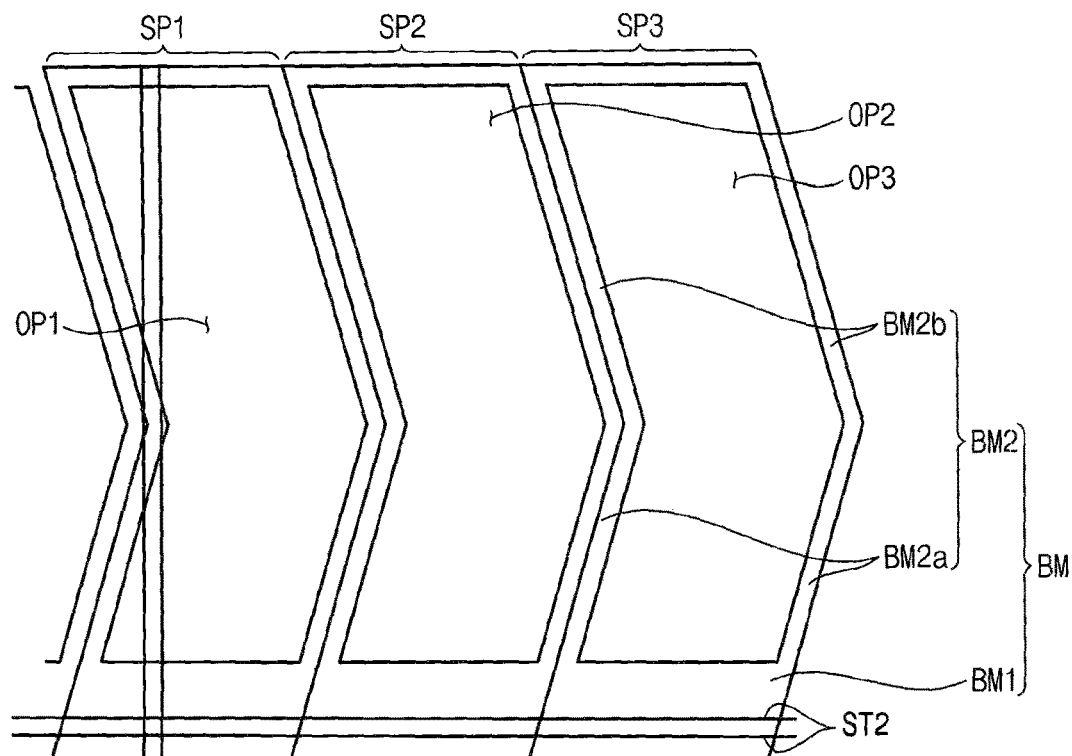
FIG. 8 is a plan view illustrating a pixel of a display panel according to an exemplary embodiment.

FIG. 8 is a plan view illustrating a pixel of a display panel according to an exemplary embodiment of the inventive concept.

Referring to FIG. 8, the display panel may be substantially the same as a display panel of FIG. 6 except for a first stitch line ST1. Thus, any further detailed descriptions concerning the same elements will be omitted or briefly described.

The display panel may include a plurality of pixels. Each of the pixels may include a first sub-pixel SP1, a second sub-pixel SP2, and a third sub-pixel SP3. The display panel may include a light blocking part BM and first to third color filters. The light blocking part BM may define a first opening OP1, a second opening OP2, and a third opening OP3.

The first sub-pixel SP1, the second sub-pixel SP2, and the third sub-pixel SP3 may be arranged in a second direction D2, which is substantially perpendicular to a first direction D1.

The light blocking part BM may define the first opening OP1 in the first sub-pixel SP1, the second opening OP2 in the second sub-pixel SP2, and the third opening OP3 in the third sub-pixel SP3. The light blocking part BM may include a first light blocking portion BM1, which extends in the second direction D2, and a second light blocking portion BM2, which is disposed between the first and second openings OP1 and OP2 and between the second and third openings OP2 and OP3, and extends in the first direction D1.

The second light blocking portion BM2 may include a first portion BM2a, which extends in a third direction D3 and makes a negative acute angle with the first direction D1, and a second portion BM2b which extends in a fourth direction D4 and makes a positive acute angle with the first direction D1.

The first light blocking portion BM1 may overlap a thin film transistor circuit configure to drive the first to third sub-pixels SP1, SP2, and SP3. The second light blocking portion BM2 may overlap a circuit which extends in the first direction D1.

The first color filter may overlap the first opening OP1 of the first sub-pixel SP1, the second color filter may overlap the second opening OP2 of the second sub-pixel SP2, and the third color filter may overlap the third opening OP3 of the third sub-pixel SP3. In one example, the first color filter may have a red color, the second color filter may have a green color, and the third color filter may have a blue color. In another example, the first color filter may have a blue color, the second color filter may have a green color, and the third color filter may have a red color.

The wire grid polarizer may include a plurality of areas in which a plurality of wire grids are formed, and a stitch line between the areas. The wire grid polarizer may be substantially the same as the wire gird polarizer of FIG. 1. For example, the wire grid polarizer may include a first stitch line ST1, which extends in the first direction D1, and a second stitch line ST2, which extends in the second direction D2.

The wire grids of the wire grid polarizer may have a pitch about 50 nm to 150 nm. The pitch may be defined as a sum of a width of the wire grid and a distance between the adjacent wire grids.

The first stitch line ST1 may overlap the first opening OP1 and the light blocking part BM. For example, the first stitch line ST1 may overlap the first opening OP1, the second portion BM2b of the second light blocking portion BM2, and the first portion BM1a of the second light blocking portion BM2 along the first direction D1. In addition, the first stitch line ST1 may not overlap the second opening OP2. In a plan view, the first stitch line ST1 may be spaced apart from the second opening OP2, which overlaps the second color filter having the green color. Thus, the first stitch line ST1 may not overlap the second color filter having the green color.

The first stitch line ST1 may have a width less than 3 um to be invisible to a user. Ideally, the width of the first stitch line ST1 may substantially the same as a width of the wire grid of the wire grid polarizer. Thus, the first stitch line ST1 may have width greater than a width of the wire grid of the wire grid polarizer, and less than 3 um. For example, the first stitch line ST1 may have width greater than about 25 nm, and less than about 3 um.

The second stitch line ST2 may overlap the first light blocking portion BM1. The first light blocking portion BM1 may overlap the thin film transistor circuit. Generally, a wire width of the thin film transistor circuit may be greater than the second stitch line ST2, so that the second stitch line ST2 may be invisible to a user.

Figure 9:
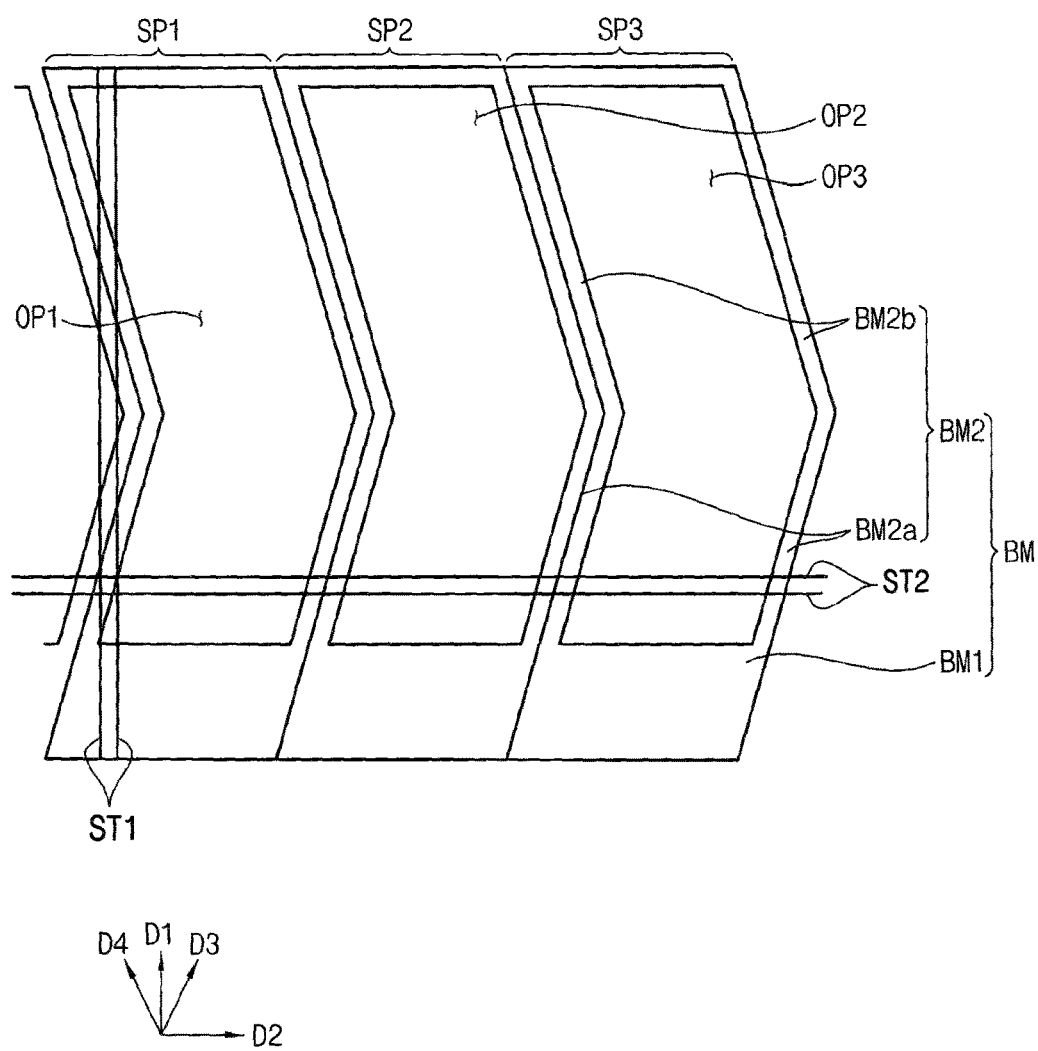
FIG. 9 is a plan view illustrating a pixel of a display panel according to an exemplary embodiment.

FIG. 9 is a plan view illustrating a pixel of a display panel according to an exemplary embodiment of the inventive concept.

Referring to FIG. 9, the display panel may be substantially the same as a display panel of FIG. 6 except for a second stitch line ST2. Thus, any further detailed descriptions concerning the same elements will be omitted or briefly described.

The display panel may include a plurality of pixels. Each of the pixels may include a first sub-pixel SP1, a second sub-pixel SP2, and a third sub-pixel SP3. The display panel may include a light blocking part BM and first to third color filters. The light blocking part BM may define a first opening OP1, a second opening OP2, and a third opening OP3.

The first sub-pixel SP1, the second sub-pixel SP2, and the third sub-pixel SP3 may be arranged in a second direction D2 which is substantially perpendicular to a first direction D1.

The light blocking part BM may define the first opening OP1 in the first sub-pixel SP1, the second opening OP2 in the second sub-pixel SP2, and the third opening OP3 in the third sub-pixel SP3. The light blocking part BM may include a first light blocking portion BM1 which extends in the second direction D2 and a second light blocking portion BM2 which is disposed between the first and second openings OP1 and OP2 and between the second and third openings OP2 and OP3, and extends in the first direction D1.

The second light blocking portion BM2 may include a first portion BM2a that extends in a third direction D3 and makes a negative acute angle with the first direction D1, and a second portion BM2b which extends in a fourth direction D4 and makes a positive acute angle with the first direction D1.

The first light blocking portion BM1 may overlap a thin film transistor circuit configured to drive the first to third sub-pixels SP1, SP2, and SP3. The second light blocking portion BM2 may overlap a circuit which extends in the first direction D1.

The first color filter may overlap the first opening OP1 of the first sub-pixel SP1, the second color filter may overlap the second opening OP2 of the second sub-pixel SP2, and the third color filter may overlap the third opening OP3 of the third sub-pixel SP3. In one example, the first color filter may have a red color, the second color filter may have a green color, and the third color filter may have a blue color. In another example, the first color filter may have a blue color, the second color filter may have a green color, and the third color filter may have a red color.

The wire grid polarizer may include a plurality of areas in which a plurality of wire grids are formed and a stitch line between the areas. The wire grid polarizer may be substantially the same as the wire gird polarizer of FIG. 1. For example, the wire grid polarizer may include a first stitch line ST1, which extends in the first direction D1, and a second stitch line ST2, which extends in the second direction D2.

The wire grids of the wire grid polarizer may have a pitch about 50 nm to 150 nm. The pitch may be defined as a sum of a width of the wire grid and a distance between the adjacent wire grids.

The first stitch line ST1 may overlap the first opening OP1, the light blocking part BM, and a third opening OP3 of an adjacent pixel. For example, the first stitch line ST1 may overlap the first opening OP1, the second portion BM2b of the second light blocking portion BM2, the third opening OP3 of the adjacent pixel, and the first portion BM2a of the second light blocking portion BM2 along the first direction D1. In addition, the first stitch line ST1 may not overlap the second opening OP2. In a plan view, the first stitch line ST1 may be spaced apart from the second opening OP2, which overlaps the second color filter having the green color. Thus, the first stitch line ST1 may not overlap the second color filter having the green color.

The first stitch line ST1 may have width less than 3 um to be invisible to a user. Ideally, the width of the first stitch line ST1 may substantially the same as a width of the wire grid of the wire grid polarizer. Thus, the first stitch line ST1 may have width greater than a width of the wire grid of the wire grid polarizer, and less than 3 um. For example, the first stitch line ST1 may have width greater than about 25 nm, and less than about 3 um.

The second stitch line ST2 may overlap the first opening OP1, the second opening OP2, and the third opening OP3. The second stitch line ST2 may affect all of the first sub-pixel SP1, the second sub-pixel SP2, and the third sub-pixel SP3, so that the second stitch line ST2 may be less visible than the first stitch line ST1, which may affect only one sub-pixel. The second stitch line ST2 may have a width less than 3 um to be invisible to a user. The second stitch line ST2 may be formed in a direction which is substantially perpendicular to an extending direction of the wire grid.

Figure 10A:
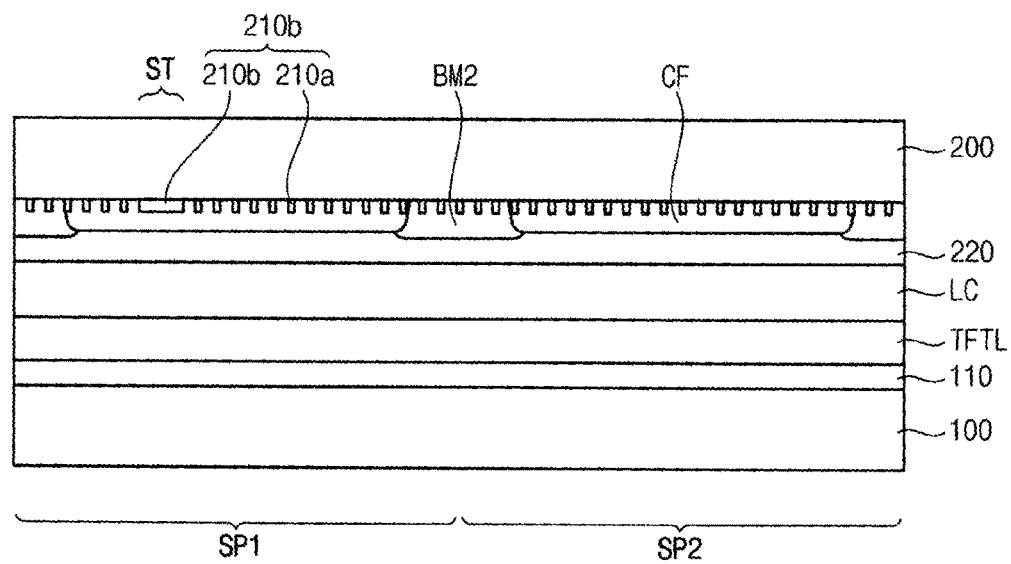
FIG. 10A is a cross-sectional view illustrating a display panel according to an exemplary embodiment.

FIG. 10A is a cross-sectional view illustrating a display panel according to an exemplary embodiment of the inventive concept.

Referring to FIG. 10A, the display panel may include a lower substrate, an upper substrate, and a liquid crystal layer LC disposed between the lower substrate and the upper substrate. The lower substrate may include a first base substrate 100, a first polarizer 110, and a thin film transistor layer TFTL. The upper substrate may include a second base substrate 200, a second polarizer 210, first to third color filter CF, a light blocking part, and an over-coating layer 220.

The first base substrate 100 may include a material which has relatively high transmittance, thermal resistance, and chemical resistance. For example the first base substrate 100 may include any one selected from the group consisting of glass, polyethylenenaphthalate, polyethylene terephthalate, polyacryl, and a mixture thereof.

The first polarizer 110 may be disposed on the first base substrate 100. The first polarizer 110 may be substantially the same as the wire grid polarizer of FIG. 1.

The thin film transistor layer TFTL may be disposed on the first base substrate 100 on which the first polarizer 110 is disposed. The thin film transistor layer TFTL may include a thin film transistor circuit having a thin film transistor for first to third sub-pixels SP1, SP2, and SP3. For example, the thin film transistor layer TFTL may include the thin film transistor including a gate electrode, a source electrode and a drain electrode, a gate line, and a data line crossing the gate line.

The second base substrate 200 may face the base substrate 100. The second base substrate 200 may include a material which has relatively high transmittance, thermal resistance, and chemical resistance. For example the second base substrate 200 may include any one selected from the group consisting of glass, polyethylenenaphthalate, polyethylene terephthalate, polyacryl and a mixture thereof.

The second polarizer 210 may be disposed on the second base substrate 200. The second polarizer 210 may include a plurality of areas in which a plurality of wire grids 210a are formed and a stitch line ST formed between the areas. The second polarizer 210 may be substantially the same as the wire grid polarizer of FIG. 1. A polarizing axis of the second polarizer 210 may be substantially perpendicular to a polarizing axis of the first polarizer 110.

The second polarizer 210 may have a pitch about 50 nm to 150 nm. The pitch may be defined as a sum of width of one of the wire grid and a distance between the wire grids adjacent each other.

The stitch line ST may be a pattern formed between the wire grids 210a which are adjacent to each other. A width of the first stitch line may be greater than a width of one of the wire grids 201a of the second polarizer 210 and less than 3 um.

The stitch line ST may be overlapped with the first color filter CF of the first sub-pixel SP1. In addition, the stitch line ST may not overlap the second color filter CF of the second sub-pixel SP2. In a plan view, the stitch line ST may be spaced apart from the second color filter which has the green color.

The first to third color filters CF may be disposed on the second base substrate 200 on which the second polarizer 210 is disposed. The first to third color filters CF may supply colors to light passing through the liquid crystal layer LC. Each of the first to third color filters CF may have a color different from a color of a color filter of adjacent pixels. The first to third color filters CF may be overlapped with adjacent color filter CF in a boundary of a pixel area. In addition, the first to third color filter CF may be spaced apart from adjacent color filter CF in the boundary of the pixel area.

The first color filter may overlap a first opening of the first sub-pixel SP1, the second color filter may overlap a second opening of the second sub-pixel SP2, and the third color filter may overlap a third opening of the third sub-pixel SP3. In one example, the first color filter may have a red color, the second color filter may have a green color, and the third color filter may have a blue color. In another example, the first color filter may have a blue color, the second color filter may have a green color, and the third color filter may have a red color.

The light blocking part may be disposed on the second base substrate 200 on which the first to third color filters CF are disposed. The light blocking part may block light. The light blocking part may define the first opening in the first sub-pixel SP1, the second opening in the second sub-pixel SP2, and the third opening in the third sub-pixel SP3. The light blocking part may include a first light blocking portion BM1 which extends in a first direction and a second light blocking portion BM2 which is disposed between the first and second openings and between the second and third openings and extends in a second direction.

The over-coating layer 220 may be disposed on the first to third color filters CF and the light blocking part. In addition, a common electrode may be further formed on the over-coating layer to apply an electric field to the liquid crystal layer LC.

The liquid crystal layer LC may be disposed between the lower substrate and the upper substrate. The liquid crystal layer LC may include liquid crystal molecules having optical anisotropy. The liquid crystal molecules may be driven by an electric field, so that an image may be displayed by passing or blocking light through the liquid crystal layer LC.

Figure 10B:
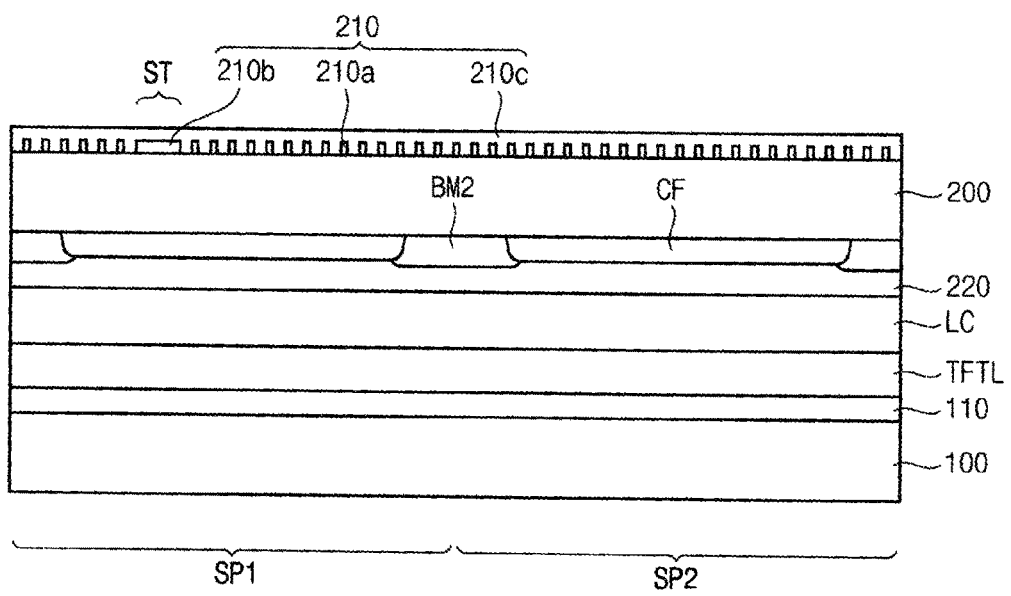
FIG. 10B is a cross-sectional view illustrating a display panel according to an exemplary embodiment.

FIG. 10B is a cross-sectional view illustrating a display panel according to an exemplary embodiment of the inventive concept.

Referring to FIG. 10B, the display panel may be substantially the same as a display panel of FIG. 10A except for a second polarizer 210. Thus, any further detailed descriptions concerning the same elements will be omitted or briefly described.

The display panel may include a lower substrate, an upper substrate, and a liquid crystal layer LC disposed between the lower substrate and the upper substrate. The lower substrate may include a first base substrate 100, a first polarizer 110, and a thin film transistor layer TFTL. The upper substrate may include a second base substrate 200, a second polarizer 210, first to third color filters CF, a light blocking part and an over-coating layer 220.

The first base substrate 100 may include a material which has relatively high transmittance, thermal resistance, and chemical resistance.

The first polarizer 110 may be disposed on the first base substrate 100. The first polarizer 110 may be substantially the same as the wire grid polarizer of FIG. 1.

The thin film transistor layer TFTL may be disposed on the first base substrate 100 on which the first polarizer 110 is disposed. The thin film transistor layer TFTL may include a thin film transistor circuit having a thin film transistor to first to third sub-pixels SP1, SP2, and SP3.

The second base substrate 200 may face the base substrate 100. The second base substrate 200 may include a material which has relatively high transmittance, thermal resistance, and chemical resistance.

The second polarizer 210 may be disposed on the second base substrate 200. The second polarizer 210 may include a plurality of areas in which a plurality of wire grids 210a is formed and a stitch line ST formed between the areas. The second polarizer 210 may be substantially the same as the wire grid polarizer of FIG. 1. A polarizing axis of the second polarizer 210 may be substantially perpendicular to a polarizing axis of the first polarizer 110.

The second polarizer 210 may have a pitch about 50 nm to 150 nm.

The stitch line ST may be a pattern formed between the wire grids 210a which are adjacent to each other. A width of the first stitch line may be greater than a width of one of the wire grids 201a of the second polarizer 210 and less than 3 um.

The stitch line ST may be overlapped with the first color filter CF of the first sub-pixel SP1. In addition, the stitch line ST may not overlap the second color filter CF of the second sub-pixel SP2. In a plan view, the stitch line ST may be spaced apart from the second color filter, which has a green color.

The second polarizer 210 may further include an insulation layer disposed on the second base substrate 200 on which the wire grids 210a and the pattern 210b are disposed. The insulation layer may include inorganic material such as silicon nitride (SiN$_x$) and silicon oxide (SiO$_x$), or organic material. In addition, the insulation layer may have a single layer structure or a multi-layer structure having organic and/or inorganic material.

In addition, the second polarizer 210 may further include an adhesive layer to be attached to the second base substrate 200. The second polarizer 210 may be attached to the second base substrate 200.

The first to third color filters CF may be disposed on the second base substrate 200 and opposite to the second polarizer 210 with respect to the second base substrate 200. The first to third color filter CF may supply colors to light passing through the liquid crystal layer LC. Each of the first to third color filter CF may have a color different from a color of a color filter of adjacent pixels. The first to third color filters CF may be overlapped with adjacent color filter CF in a boundary of a pixel area. In addition, the first to third color filters CF may be spaced apart from adjacent color filter CF in the boundary of the pixel area.

The first color filter may overlap a first opening of the first sub-pixel SP1, the second color filter may overlap a second opening of the second sub-pixel SP2, and the third color filter may overlap a third opening of the third sub-pixel SP3. In one example, the first color filter may have a red color, the second color filter may have a green color, and the third color filter may have a blue color. In another example, the first color filter may have a blue color, the second color filter may have a green color, and the third color filter may have a red color.

The light blocking part may be disposed on the second base substrate 200 on which the first to third color filters CF are disposed. The light blocking part may block light. The light blocking part BM may define the first opening in the first sub-pixel SP1, the second opening in the second sub-pixel SP2, and the third opening in the third sub-pixel SP3. The light blocking part may include a first light blocking portion BM1 and the second light blocking portion BM2.

The over-coating layer 220 may be disposed on the first to third color filters CF and the light blocking part. In addition, a common electrode may be further formed on the over-coating layer to apply an electric field to the liquid crystal layer LC.

The liquid crystal layer LC may be disposed between the lower substrate and the upper substrate. The liquid crystal layer LC may include liquid crystal molecules having optical anisotropy. The liquid crystal molecules may be driven by an electric field, so that an image may be displayed by passing or blocking light through the liquid crystal layer LC.

Figure 11:
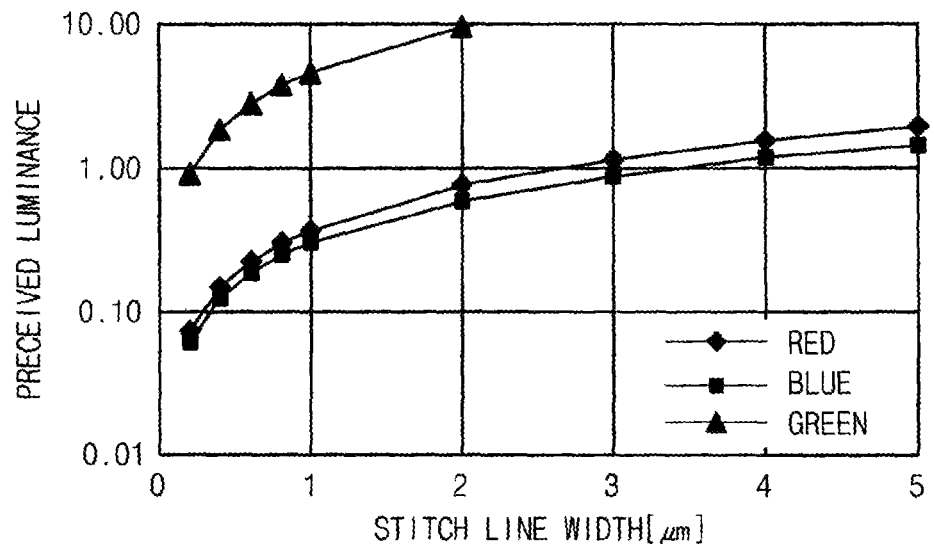
FIG. 11 is a graph illustrating result of an example simulation about perceived luminance by color according to width of a stitch line.
Figure 12:
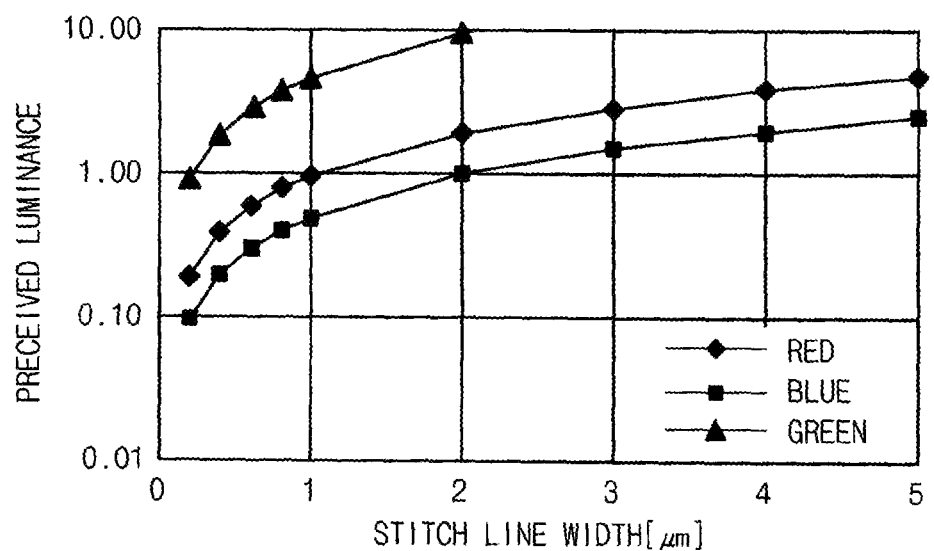
FIG. 12 is a graph illustrating result of another example simulation about perceived luminance by color according to width of a stitch line.

FIG. 11 is a graph illustrating result of an example simulation about perceived luminance by color according to a width of a stitch line. FIG. 12 is a graph illustrating result of another example simulation about perceived luminance by color according to a width of a stitch line Referring to FIG. 11, the simulation has been performed in a condition with a sub-pixel being a size of about 100 um*300 um, brightness of a display panel being 350 nit, viewing distance being 30 cm, and brightness ratio of red, green, and blue sub-pixels being 2:7:1. The graph of FIG. 11 means a degree of recognition to the stitch line according to width of the stitch line.

The x-axis of the graph represents the width of the stitch line, and the y-axis represents perceived luminance. The perceived luminance is induced by Weber-Fechner's Law and Contrast Sensitivity Function. Academically, when the perception is more than one, users may recognize the stitch line.

As a result of the simulation, perceived luminance of a green sup-pixel is higher than that of red or blue sub-pixel, when width of the stitch line is same. Thus, the maximum width of the stitch line for invisibility of the green sub-pixel is smallest, and that of the red or blue sub-pixel is greater than that of the green sub-pixel.

TABLE 1

|  | red sub-pixel | green sub-pixel | blue sub-pixel |
| --- | --- | --- | --- |
| maximum width of the stitch line for invisibility (in micrometers) | 3 | 0.2 | 3 |

Thus, according to the exemplary embodiments, the stitch line of the wire grid polarizer may be disposed not to overlap the green sub-pixel. Accordingly, a display apparatus without degradation of display quality may be provided without a precise alignment process of a light blocking part and the wire grid polarizer.

Referring to FIG. 12, the simulation has been performed in a condition with a sub-pixel having a size about 50 um*150 um, brightness of a display panel being 350 nit, viewing distance being 30 cm, brightness ratio of red, green, and blue sub-pixels being 2:7:1. The graph of FIG. 12 represents a degree of recognition to the stitch line according to width of the stitch line.

The x-axis of the graph represents the width of the stitch line, and the y-axis represents perceived luminance. The perceived luminance is induced by Weber-Fechner's Law and Contrast Sensitivity Function. Academically, when the perception is more than one, users may recognize the stitch line.

As a result of the simulation, perceived luminance of a green sup-pixel is greater than that of a red or blue sub-pixel, when the width of the stitch line is same. Thus, the maximum width of the stitch line for invisibility of the green sub-pixel is smallest, and that of the red or blue sub-pixel is greater than that of the green sub-pixel.

TABLE 2

|  | red sub-pixel | green sub-pixel | blue sub-pixel |
| --- | --- | --- | --- |
| maximum width of the stitch line for invisibility (in micrometers) | 1 | 0.2 | 2 |

Thus, according to the exemplary embodiments, the stitch line of the wire grid polarizer may be disposed so as to not overlap the green sub-pixel. Accordingly, a display apparatus without degradation of display quality may be provided without a precise alignment process of a light blocking part and the wire grid polarizer.

According to the exemplary embodiments of the present inventive concept, a display panel includes a large area wire grid polarizer having a stitch line. The stitch line of the wire grid polarizer is disposed so as to not overlap a green sub-pixel, so that a display apparatus without degradation of display quality may be provided without a precise alignment process of a light blocking part and the wire grid polarizer.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display panel comprising a plurality of pixels, each of the pixels comprising:
    a light blocking part configured to define a first opening, a second opening, and a third opening;
    a first color filter that overlaps the first opening and has a red color;
    a second color filter that overlaps the second opening and has a green color;
    a third color filter that overlaps the third opening and has a blue color; and
    a wire grid polarizer comprising a first stitch line spaced apart from the second opening in a plan view,
    wherein:
    the first stitch line overlaps the first opening or the third opening;
    the light blocking part comprises a first light blocking part and a second light blocking part;
    the first blocking part extends in the second direction, and the second light blocking part extends in the first direction and is disposed between the first and second color filters and between the second and third color filters;
    the first light blocking part has a width greater than that of the second light blocking part;
    the wire grid polarizer further comprises a second stitch line which crosses the first stitch line; and
    the second stitch line overlaps the first light blocking part.

2. The display panel of claim 1, wherein a width of the first stitch line is greater than a width of one of a wire grid of the wire grid polarizer, and less than 3 um (micrometers).

3. The display panel of claim 2, wherein the first stitch line comprises an opening defined by adjacent wire grids adjacent to the first stitch line, or a pattern formed between the adjacent wire grids.

4. The display panel of claim 1, wherein:
    the first stitch line extends in a first direction and
    the first color filter, the second color filter, and the third color filter are arranged in a second direction crossing the first direction.

5. The display panel of claim 1, wherein the second stitch line extends in the second direction which is substantially perpendicular to an extending direction of the wire grids of the wire grid polarizer.

6. The display panel of claim 1, wherein:
    the second light blocking part comprises a first portion extending in a third direction and a second portion extending in a fourth direction;
    the third direction makes a negative acute angle with the first direction and the fourth direction makes a positive acute angle with the first direction; and
    the first stitch line overlaps the first portion of the first light blocking part and the second portion of the first light blocking part.

7. The display panel of claim 6, wherein the first stitch line overlaps the first opening and a third opening of an adjacent pixel.

8. The display panel of claim 1 further comprising:
    a first base substrate;
    a second base substrate facing the first base substrate; and
    a liquid crystal layer disposed between the first base substrate and the second base substrate,
    wherein the wire grid polarizer comprises a first wire grid polarizer disposed on the first base substrate and a second wire grid polarizer disposed on the second base substrate and having a polarizing axis which is substantially perpendicular to that of the first polarizer, and
    each of the first and second wire grid polarizer overlaps at least one of the light blocking part and the first opening, and comprises the first stitch line spaced apart from the second opening in a plan view.

9. The display panel of claim 1, wherein the wire grid polarizer comprises a plurality of areas in which a plurality of wire grids are formed, and the first stitch line is disposed between at least two of the areas.

10. The display panel of claim 9, wherein each of the areas has a diagonal length less than 12 inches.

11. The display panel of claim 1, wherein, when the pixel displays white, a brightness of a first light which passes the second color filter is greater than a brightness of a second light which passes the first color filter or the third color filter.

* * * * *